June 21, 1960 V. A. BOUFFORT 2,941,754
AIRCRAFT PROVIDED WITH ELEVATED STABILIZING MEMBERS
Filed April 2, 1956 5 Sheets-Sheet 4
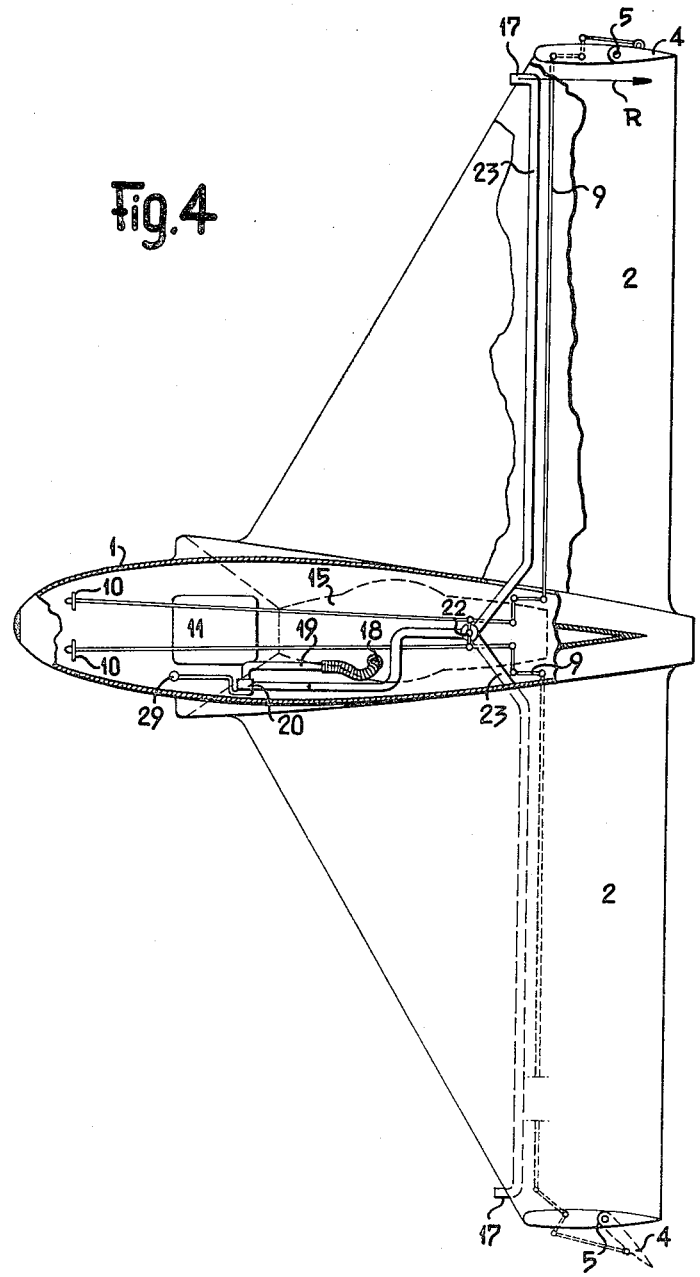
INVENTOR
VICTOR ALBERT BOUFFORT
By Young, Emery + Thompson
ATTYS.

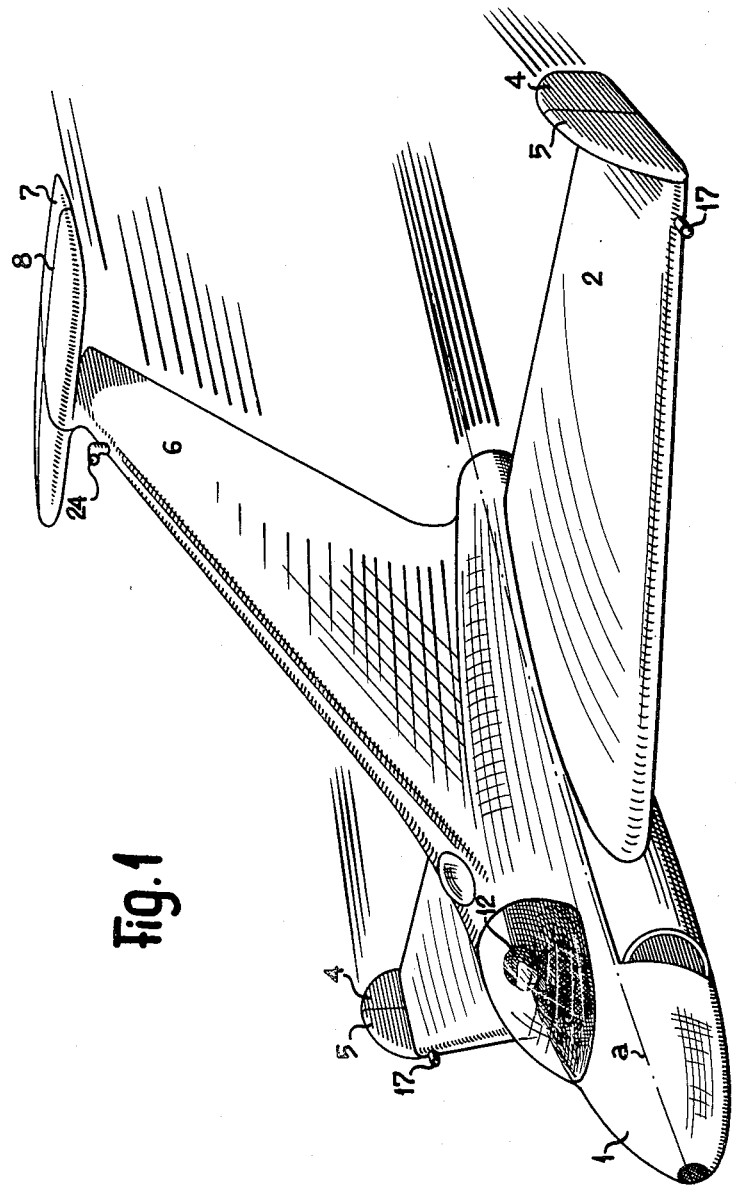

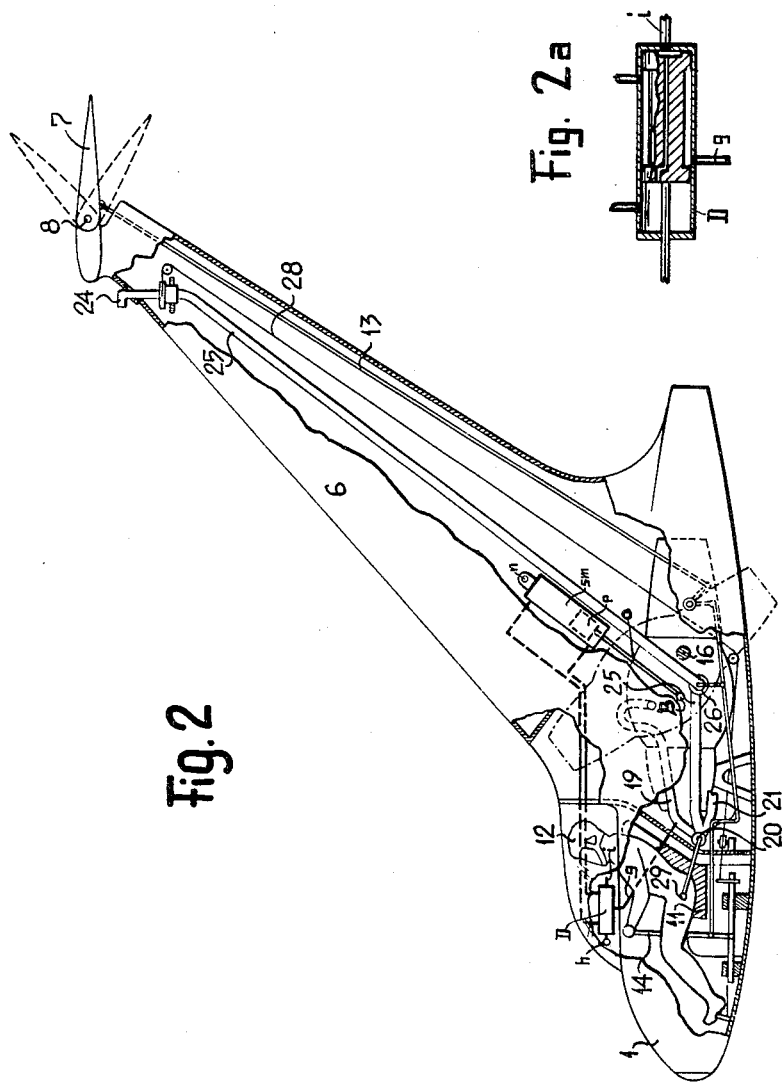

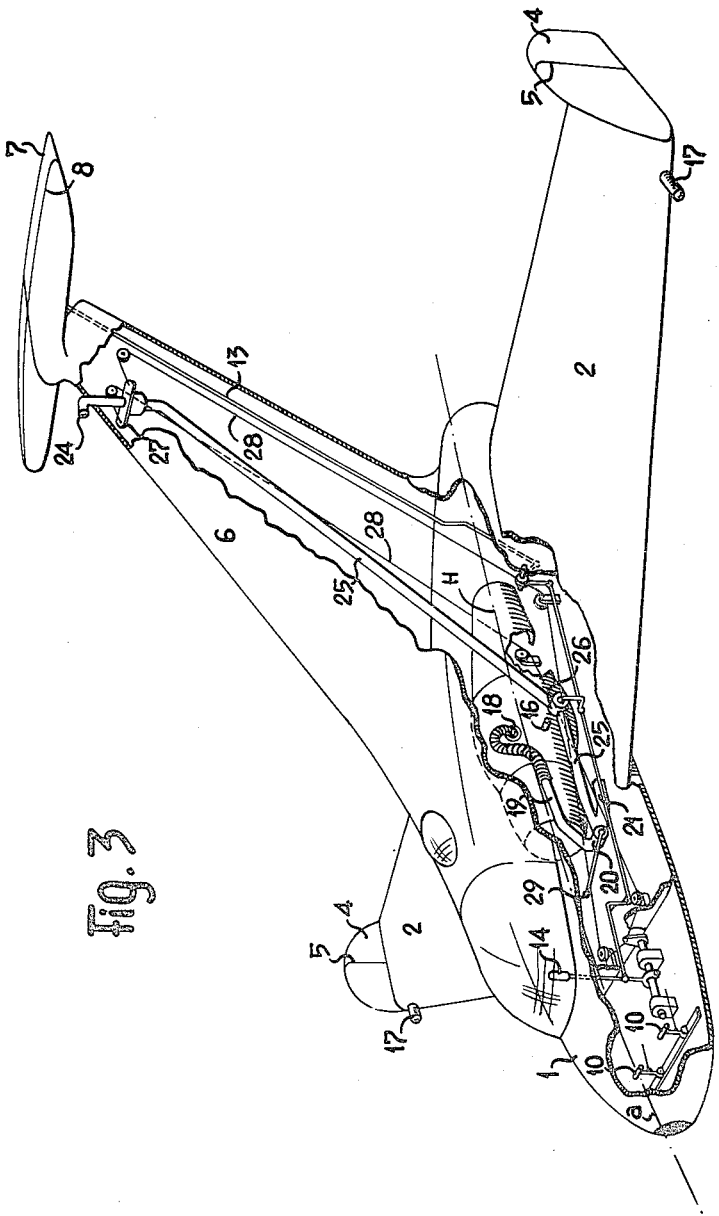

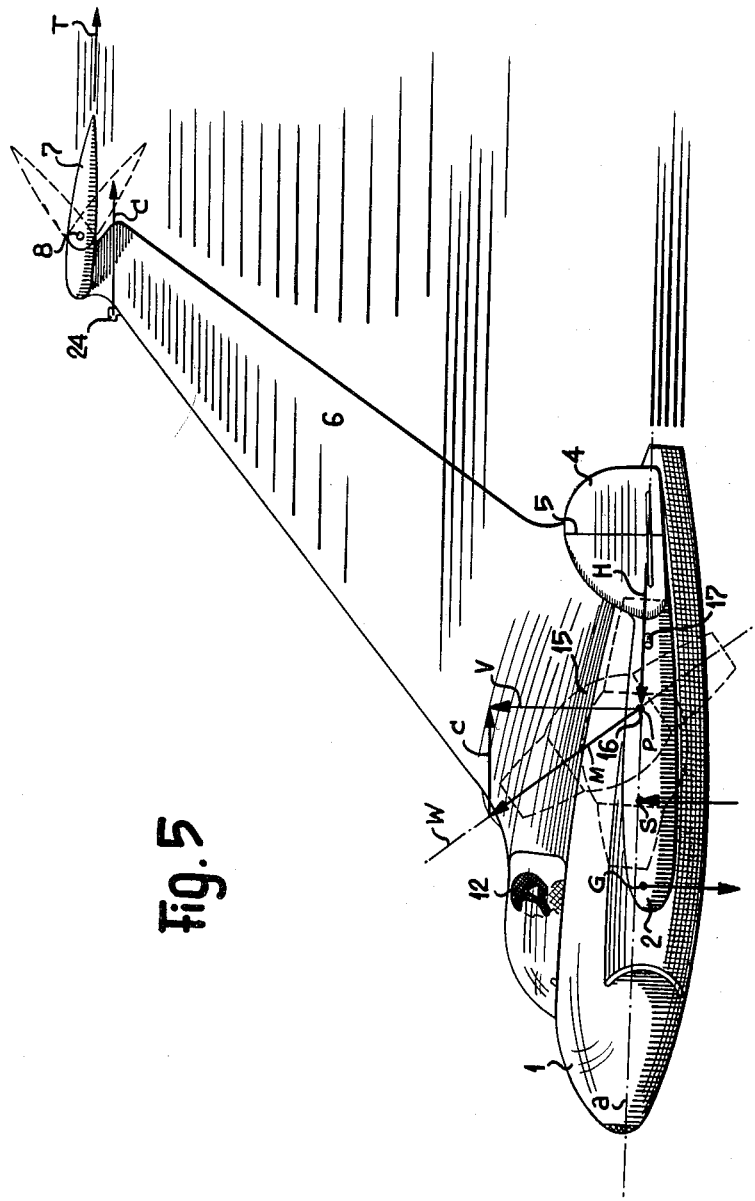

United States Patent Office 2,941,754
Patented June 21, 1960

2,941,754

AIRCRAFT PROVIDED WITH ELEVATED STABILIZING MEMBERS

Victor Albert Bouffort, 30, Rue Velasquez, Tangiers

Filed Apr. 2, 1956, Ser. No. 575,591

Claims priority, application Switzerland May 27, 1955

5 Claims. (Cl. 244—83)

There exists actually several kinds of aircraft comprising elevated stabilizing members carried by a mast or a vertical wing. This kind of aircraft presents noteworthy flying and stabilizing characteristics which in particular allow the landing at a speed far less than the minimum sustentation speed.

The present invention has for its object an aircraft of said kind which is characterized by the fact that it presents for the flight at a speed less than the minimum sustentation speed, on the one hand auxiliary steering devices and on the other hand, auxiliary stabilizing devices located at the upper end of the vertical wing, said steering and stabilizing devices comprising nozzles, each fed with compressed air by the intermediary of a regulating device of the delivery of air. The nozzles are located at the extremities of the horizontal and vertical wings and are directed towards the head of the aircraft. The aircraft is equipped with at least one propulsion group capable of developing a thrust directed towards the top and the head of the aircraft, and the center of gravity of the aircraft is located ahead of the sustentation thrusts center of the wings and of the propelling thrusts center of the propulsion group, the entire system being arranged in a manner to allow an approximative vertical take off.

The attached drawing shows schematically and by way of example a form of execution of the aircraft object of the invention.

Fig. 1 is a perspective view of same.
Fig. 2 is a side view certain parts being cut away.
Fig. 2a is a detail view in cross section of a distributor.
Fig. 3 is a perspective view certain parts being cut away.
Fig. 4 is a plan view certain parts being cut away.
Fig. 5 is a side view.

According to the attached drawing, the aircraft comprises a body 1 of an elongated shape, and carrying two lateral wings 2 provided each at their extremity with a steering member 4 articulated along an axis 5 perpendicular to the longitudinal axis $a$ of the body 1, and a mast or vertical wing 6 fastened on the body symmetrically with respect to the vertical plane of symmetry passing through the longitudinal axis $a$. The upper end of said vertical wing is provided with elevated stabilizing members 7 articulated along an axis 8 perpendicular to the vertical plane of symmetry.

The steering members 4 are connected by means of a system of rods 9 (Fig. 4) with two pedals 10 located ahead of a seat 11 on which a pilot 12 takes place. The elevated stabilizing members 7 are connected by means of a system of rods 13 (Figs. 2 and 3) with a direction-stick 14. Since all these members, as well as their control and actuating devices, are of known types and already used on existing aircraft, it is considered unnecessary to describe them in more detail.

The aircraft is provided with a motor propulsion group constituted by a jet propulsion motor 15, tipping between two service positions along a horizontal axis 16 perpendicular to the vertical plane of symmetry. Some aircraft put recently in use comprise also a tipping jet propulsion motor, so that it is useless to describe here in detail the locking devices of said motor in service position and the actuating devices causing the tipping of the motor from one to the other of its two service positions.

In order to permit, at the time of the landing or of the taking off, to fly at a speed lower than the minimum sustentation speed and keeping however the control of the aircraft, said latter is provided with an auxiliary steering device and with an auxiliary stabilizing device, located respectively at the extremities of the lateral and vertical wings. The auxiliary steering device comprises two nozzles 17 disposed at the extremities of the wings 2 and connected with a compressed air source 18 by means of a feeding duct 19, provided with a stop-valve 20, with a duct 21 provided with a regulating member 22 of the delivery of compressed air. Said regulating member feeds the two ducts 23 connected to the nozzles 17. Each nozzle 17, located in a horizontal plane, is directed towards the head of the aircraft. The regulating member 22 is constituted by a three-way valve mechanically connected with the systems of rods 9 controlling the steering rudders 4.

The auxiliary stabilizing device comprises a swivelling nozzle 24 located at the upper end of the vertical wing 6. The bent extremity of said nozzle 24 is articulated along a vertical axis on the extremity of a feeding duct 25 connected with the compressed air source 18. Said duct 25, connected with the stop-valve 20, is provided with a regulating member 26 mechanically connected with the system of rods 13 actuating the stabilizing members 7.

Besides, the bent part of the nozzle 24 carries a swing bar 27, connected by means of two cables 28 with the direction-stick 14.

Finally, the center of gravity G of the aircraft is located ahead of the sustentation thrust center S and of the thrust center P of the jet propulsion motor 15. Consequently, the aircraft has normally the tendency to nose-dive. Said tendency is counterbalanced by the drag effect T of the elevated stabilizing members. According to the angular position of the stabilizing members 7 with respect to the horizontal plane, the value of the drag effect T is more or less important and causes a more or less pronounced buck effect tending to pick up the nose of the aircraft. Thus the pilot may, by a simple actuating of the stabilizing member 7, cause the rising, the horizontal flight or the nearly vertical descent of the aircraft. During the vertical descent, the horizontal speed being nil or very little, the steering rudders 4, actuated by the pedals 10, do not have any effect. However, the pilot may control the aircraft by operating a control lever 29 causing the opening of the stop-valve 20. From then on he may, by acting on the pedals 10, drive compressed air in one or in the other of the nozzles 17 and adjust the delivery of said compressed air. The greater the delivery of air to a nozzle 17, the greater is the reaction force R. Said reaction force R causes the turning of the aircraft about its center of gravity.

In order to effect a practically vertical take-off, the pilot actuates the handle $h$ (Fig. 2) of a distributor D connected by a duct $g$ to the pipe 19 of the compressor. Said distributor D has an outlet $i$ and connects alternatively to said outlet and to said duct $g$ the two chambers of a servomotor $sm$ hinged at $n$ to a fixed part. The piston $p$ of said servomotor is mechanically connected to said jet propulsion motor 15 by means of a rod $o$ hinged at B on said motor.

The position of the motor 15 after movement by servomotor $sm$ will be along the axis W (Fig. 5). The motor 15 develops then a thrust M directed towards the top and the head of the aircraft. If now, the pilot opens the stop-valve 20 and the regulating valve 26 by keeping the swivelling nozzle 24 in the vertical plane of symmetry, said nozzle develops a buck thrust C which opposes the horizontal advancing of the aircraft. The resultant of said two thrusts M and C is a thrust V directed vertically or approximatively vertically towards the top. It follows that the aircraft rises approximatively vertically. During said rising, the pilot has the possibility, by putting in action the auxiliary steering device, to keep course of the aircraft against the action of the wind acting on the wings and the fuselage.

When the aircraft has climbed, the pilot reduces progressively the delivery of the nozzle 24 by operating the direction-stick 14 in order that the aircraft takes progressively an always greater horizontal speed. When said horizontal speed is greater than the minimum speed for sustentation, the pilot acts on the lever 29 in order to cause the complete closing of the feeding with compressed air of the nozzles 17 and 24, and then causes the tipping of the jet propulsion motor 15, until its service position H or cruising position (Fig. 3). The thrust of the engine is then situated in the axis $a$ of the aircraft and the horizontal speed of the aircraft is sufficient in order that, on the one hand, the thrust of the air acting on the wings 2 sustains the aircraft and that, on the other hand, the thrust of the air acting on the steering devices 4 and the stabilizing devices 7 allows to steer and to control the aircraft.

It is clear that it may be of advantage for the stability of the aircraft, that the thrust center S may merge with the propulsion thrust center P.

Besides, in a variant, the rudders 4 of the steering device may be located at the extremity of a tail of the aircraft.

From the foregoing, one may easily see the great practical advantages which may present an aircraft according to the invention. Indeed, without increase of the surface of the wings, the aircraft may take off and land practically vertically with the help of the auxiliary stabilizing devices which may be nearly wholly housed inside the vertical wing and which hence do not perturb in any way, the air streams during the cruising flight. Consequently, the maximum speed of the aircraft is not modified by the auxiliary steering and stabilizing devices. This peculiarity of the aircraft is an object of the invention and is very important for it allows to reduce to a minimum the surface of the wings of the fast aircraft, that is to say that said surfaces may be calculated in order to obtain the sustentation of the aircraft by cruising flight and no more in function of the minimum landing speed. Notwithstanding said reduced wing surface, the aircraft of the invention is capable to land and to take off practically vertically. Finally said aircraft presents the very advantageous qualities of stability of the aircraft provided with elevated stabilizing devices due, on the one hand, to the elevation of said devices and, on the other hand, to the vertical wing which opposes in a very efficaceous manner, the slipping of the aircraft and preventing the aircraft from going into a spin. Finally, the center of gravity G being located ahead of the thrust center S, the aircraft tends to nose-dive and its horizontability is reestablished by the buck effect developed by the elevated stabilizing members. It follows that the aircraft may easily be maintained in the horizontal plane and presents very good qualities of handiness and stability.

One form of construction of the aircraft in accordance with the invention has been described here by way of example and with reference to the attached drawing, but it goes without saying that many variants may be foreseen, adapted to the several requirements which may be imposed.

Thus for instance, the elevated stabilizing device may be constituted by a rudder articulated along a horizontal plane, as illustrated in the drawing, but it may also be constituted by two identical rudders articulated along a vertical or approximately vertical axis, located in the vertical plane of symmetry of the vertical wing 6.

The extremity 24 of the upper nozzle does not need to swivel; it may also be fixed and located in the vertical plane of symmetry of the vertical wing 6.

It is clear that an aircraft according to the invention may be equipped with any number of propulsion groups constituted either by tipping jet propulsion motor, as described with reference to the attached drawing, or by piston motors or further by turbo propellers driving for instance co-axial sustentation air-screws having vertical axes.

Finally, many forms of construction adapted to the kind of aircraft foreseen and to the different requirements imposed may be foreseen.

I claim:

1. In an aircraft, jet engine means mounted for tilting movement between a first position for driving the aircraft forward and a second position in which the thrust is directed upwardly and forwardly, the line of thrust of said jet engine means in the second position thereof passing rearwardly of the aircraft center of gravity, movable pitch control surface means on said aircraft and movable yaw control surface means on said aircraft aerodynamically operative during forward flight of said aircraft, forwardly facing nozzle means mounted at each wing tip of said aircraft, forwardly facing nozzle means mounted on said aircraft above the fuselage thereof, means to supply said nozzle means with compressed gas and including regulating means for each of said nozzle means, control means connected to said control surface means for actuation thereof by the pilot, means connecting the control means for said pitch control surface means to the regulating means for said second-mentioned nozzle means, and means connecting the control means for said yaw control surface means to the regulating means for said first-mentioned nozzle means.

2. In an aircraft, thrust-producing means mounted for tilting movement between a first position for driving the aircraft forward and a second position in which the thrust is directed upwardly and forwardly, the line of thrust of said thrust-producing means in the second position thereof passing rearwardly of the aircraft center of gravity, two lateral sustentation wings and a vertical wing member, movable pitch control surface means located at the upper extremity of said vertical wing member, movable yaw control surface means located at each extremity of said lateral wings, said pitch control means and said yaw control means being aerodynamically operative during forward flight of said aircraft, auxiliary thrust-producing means located on said vertical wing member above the fuselage of said aircraft producing a thrust directed rearwardly, control means for actuating said auxiliary thrust-producing means by the pilot for the vertical take-off of the aircraft, and control means connected to said control surface means for actuation thereof by the pilot for the forward driving of said aircraft.

3. An aircraft as claimed in claim 2 and in which said auxiliary thrust means comprises forwardly facing nozzle means located at the upper extremity of said vertical wing member, means to supply said nozzle means with compressed air, and supply regulating means connected to said control means of said pitch control surface means and controlling the air supply to said nozzle.

4. An aircraft as claimed is claim 3 and comprising further forwardly facing nozzle means located at each extremity of said two lateral wings of said aircraft, means to supply said nozzle means with compressed air, and supply regulating means connected to said movable yaw control surface means and controlling the air supply of each of said nozzle means individually.

5. An aircraft as claimed in claim 4 and in which said first-mentioned nozzle means located at the upper extremity of said vertical wing member is angularly displaceable in a plane substantially parallel to the sustentation surface of said lateral wings, a steering stick for actuation by the pilot, connecting means connecting said displaceable nozzle means to said steering stick, and connecting means connecting said steering stick to said regulating means of said nozzles and to said pitch control surface means.

References Cited in the file of this patent

UNITED STATES PATENTS

| | | |
|---|---|---|
| 1,838,354 | Bauer | Dec. 29, 1931 |
| 1,879,717 | Sikorsky | Sept. 27, 1932 |
| 1,957,896 | Marguglio | May 8, 1934 |
| 2,120,065 | De Rouge | June 7, 1938 |
| 2,395,435 | Thompson et al. | Feb. 26, 1946 |
| 2,465,457 | Johnston | Mar. 29, 1949 |
| 2,472,839 | Kramer | June 14, 1949 |
| 2,478,847 | Stuart | Aug. 9, 1949 |
| 2,589,732 | Riviere | Mar. 18, 1952 |
| 2,621,871 | Robert | Dec. 16, 1952 |
| 2,691,953 | Hanley | Oct. 19, 1954 |
| 2,762,584 | Price | Sept. 11, 1956 |
| 2,774,554 | Ashwood et al. | Dec. 18, 1956 |